United States Patent Office 3,741,789
Patented June 26, 1973

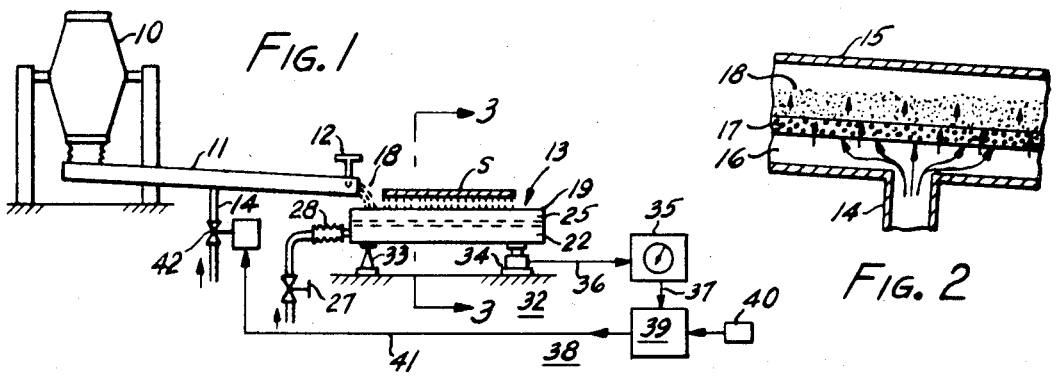
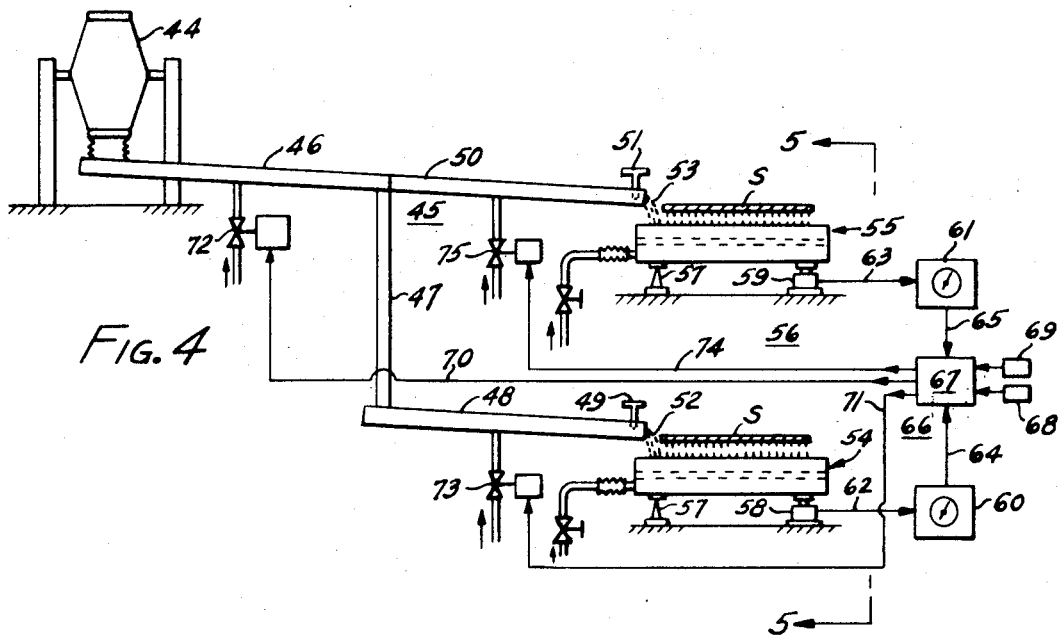
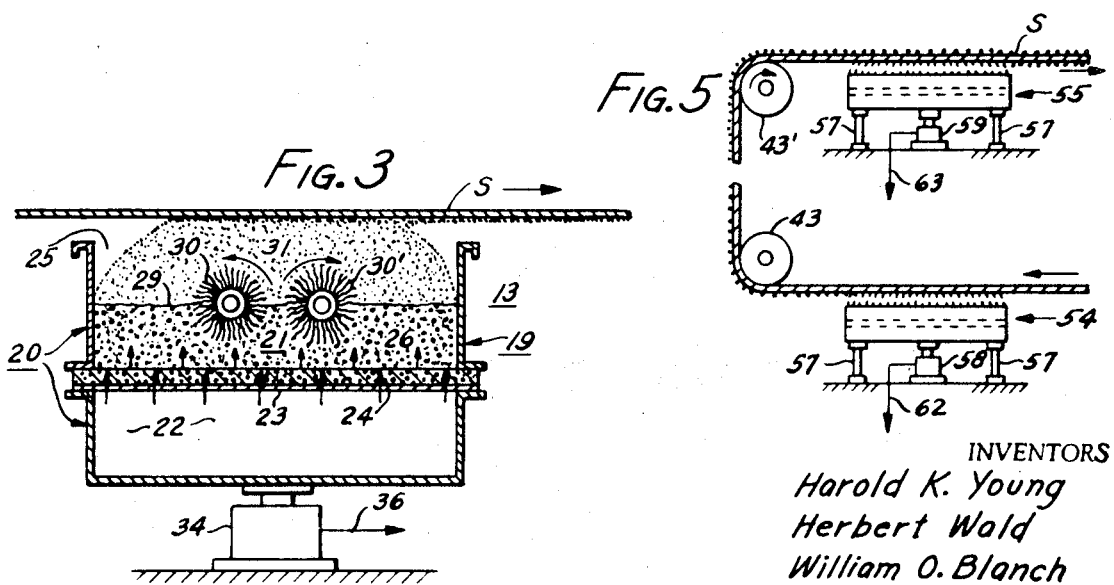

3,741,789
METHOD OF APPLYING PARTICLES TO A SURFACE
Harold K. Young, Herbert Wald, William O. Blanch, and Lacy C. Meadows, Baltimore, Md., assignors to Bethlehem Steel Corporation
Original application May 29, 1969, Ser. No. 829,014, now Patent No. 3,653,544. Divided and this application May 19, 1971, Ser. No. 144,952
Int. Cl. B44d 1/094
U.S. Cl. 117—16         6 Claims

ABSTRACT OF THE DISCLOSURE

Particle dispensing apparatus coats one or more surfaces of a workpiece such as a moving web, strip, sheet, plate or flat wire. Particles are fed from at least one source over fluidized conveyors to separate particle applicators associated with each surface to be coated. Each particle applicator includes a receiver-dispenser having a fluidized bed and counter-rotating brush rolls which continuously picks up fluidized particles and discharges them against one of the surfaces to be coated in an amount which varies with particle level in the receiver-dispenser. A separate load cell supports each receiver-dispenser and drives a load indicator which produces weight signals that are related to particle level in each receiver-dispenser. A controller receiving the weight signals acts on the conveyor means to independently maintain a predetermined level of particles in each receiver-dispenser. This provides a uniform application of particles on each surface of the workpiece to be coated.

CROSS-REFERENCE TO RELATED APPLICATION

This is a divisional application of copending application Ser. No. 829,014 filed May 29, 1969 now Pat. No. 3,653,544, entitled "Particle Dispensing Apparatus and Method."

BACKGROUND OF THE INVENTION

This invention relates broadly to strip coating, and more particularly to strip coating utilized in coating one or more surfaces of a workpiece. Coating may result from the application of either organic or inorganic particles, or combinations of these, onto a surface of such workpieces as a moving web, strip, sheet, plate or flat wire, or other members.

Frequently in the formation of certain coatings on a workpiece, a particle applicator is used to deposit particles on a previously prepared surface of the workpiece. One such particle applicator used in the formation of metal coatings on the surface of continuous lengths of moving steel strip, for example, is the fluidizing pumping bed disclosed and claimed in U.S. Pat. No 3,565,662 of G. W. Ward et al. entitled "Strip Coating Method and Apparatus."

The Ward et al. particle applicator includes a receiver-dispenser having incorporated therein a means for fluidizing a bed of particles and particle discharge assistance means. The latter means continuously picks up fluidized particles, such as ferrochromium powder, and pumps, or otherwise discharges, these particles against the underside of a horizontally moving steel strip which has been filmed with an adhesive material. In this manner, particles are deposited uniformly across the width of the moving strip prior to compacting and heat treating.

Heretofore, particles fed to the Ward et al. type of particle applicator had been performed by hand methods. Although this applicator has proved quite successful, it has been observed that the amount of particles discharged by said discharge assistance means varies in relation to particle level in the receiver-dispenser. This causes corresponding variations in longitudinal uniformity of particle coating on the moving strip. Moreover, particularly during prolonged operations where an attendant may become fatigued, failure to maintain the particles within a predetermined level results in a blow-through by the fluid bed when the level is too low, or in a bogging down of the fluidized particles when the level is too high. Both situations cause bare sections to occur in the particle coating on said strip.

Two operating characteristics of the aforesaid type of particle applicator are detrimental in determining particle level in the receiver-dispenser. These are particle agitation and dusting, particularly in the vicinity of the particle discharge assistance means which appears to be sensitive to variations in particle level. Hence, the use of conventional level detecting means, such as float-operated switches and electro-optical sensors, is entirely unsatisfactory.

One of the objects of this invention is to provide improved apparatus and method for coating strip with particulate materials.

A further object of this invention is to dispense particles uniformly in the formation of coatings on a workpiece, without attendant particle applicator problems.

Another object of this invention is to provide a method of maintaining particle level in a particle applicator without directly measuring particle level therein.

Other and further objects of this invention will become apparent during the course of the following description and by reference to the accompanying drawings and appended claims.

The foregoing objects can be attained with automatic particle dispensing by feeding particles from a source via fluidized conveyor means to the particle applicator, weighing the receiver-dispenser and continuously producing a weight signal related to the particle level therein during particle discharge therefrom, and controlling the conveyor means with control means responsive to the weight signal, thereby maintaining a predetermined level of particles in the receiver-dispenser and automatically controlling the amount and uniformity of particles applied to a surface of the workpiece. Where more than one surface of a workpiece is to be coated, separate particle applicators are provided for each surface, these being fed independently from either the same or different sources under control of separate weight signals associated therewith.

DESCRIPTION OF THE DRAWINGS

FIG. 1 is a schematic diagram of one embodiment of the present invention.

FIG. 2 is an enlarged elevational view in longitudinal section of a fluidized conveyor used in the apparatus of the present invention.

FIG. 3 is an elevational view in transverse section of a particle applicator used in said apparatus.

FIG. 4 is a schematic diagram of another embodiment of the present invention.

FIG. 5 is a schematic elevational view taken in the embodiment shown in FIG. 4.

DESCRIPTION OF THE PREFERRED EMBODIMENT

A full description of the apparatus, and of the manner by which it can be utilized for dispensing particles in connection with coating first one, then two, sides of continuous lengths of moving strip, will be given in the following examples.

Referring to the drawings, particularly FIG. 1, particles to be dispensed in coating one side of strip S are fed from source 10, such as a blender-reservoir, over a well known fluidized conveyor 11 and past vertically adjustable gate 12 to particle applicator 13. Fluidized conveyor 11 is powered by controlled compressed gas, such as air, from a source not shown. The compressed gas, as shown in FIG. 2, is fed over pipe 14 to housing 15 and is distributed through plenum 16 and porous diffusing membrane 17, thereby fluidizing particles 18 above the diffusing membrane. Housing 15 is inclined downward and fluidized particles 18, aided by the force of gravity, are caused to move from source 10 to particle applicator 13 in a predetermined maximum amount. This amount is governed by particle physical properties, the pressure and flow rate of the compressed gas, and the vertical position of adjustable gate 12.

Particle applicator 13 is preferably of the Ward et al. type referred to above because of its capability of dispensing a wide variety of particles, including finely divided metallic particles such as ferrochromium powder. As illustrated in FIG. 3, applicator 13 includes a receiver-dispenser 19 having means incorporated therein for assisting in the continuous discharge of particles therefrom. This means includes fluidized bed means 20 and particle discharge assistance means 21. Fluidized bed means 20 consists essentially of plenum chamber 22 loacted in the bottom of receiver-dispenser 19, felt sheet 23 and porous diffusing membrane 24 covering chamber 22, and fluidizing chamber 25 located above chamber 22. Particles fed to receive-dispenser 19 from a particle bed 26 in the lower portion of fluidizing chamber 25.

Fluidizing bed means 20 is powered continuously by applying compressed gas, such as air, from a well regulated source (not shown) by way of valve 27 and flexible pipe 28 to plenum chamber 22. Gas under predetermined pressure and flow conditions courses through felt sheet 23 and diffusing membrane 24 in all upward directions. This fluidizes particle bed 26 to particle level 29 in fluidizing chamber 20, which level is predetermined according to particle physical properties.

Particle discharge assistance means 21 is located in fluidizing chamber 25 in contact with particle bed 26. Means 21 includes closely spaced, counter-rotating, parallel brush rolls 30, 30' extending horizontally substantially from end-to-end of fluidizing chamber 25 and lateral of a horizontally moving strip S. Brush rolls 30, 30' are motor driven to rotate at a controlled speed in opposed upward direction between their centers.

By adjusting both roll speed and fluidizing gas pressure to predetermined constant values related to the physical properties of a given particulate material 18, a portion of the fluidized particle bed 26 is picked up by revolving rolls 30, 30' and raised, or otherwise discharged, upwardly above level 29 and forms a fluid body 31 of constant height above and unformly along the roll brushes. Fluid body 31 acts as a coating zone and the underside of strip S, which was previously filmed with an adhesive material, is passed horizontally in contact therewith. Thus, the underside of strip S receives a uniform concentration of particle coating across the width thereof. The amount of particles discharged by discharge assistance means 21 varies in relation to particle level 29 in receiver-dispenser 19, thus causing a corresponding variation in longitudinal uniformity of the particle coating on moving strip S.

Inasmuch as particle agitation and dusting preclude the use of certain conventional level detecting means, weigher means 32 is provided which produces a weight signal related to particle level 29 during operation of particle applicator 13. Weigher means 32 comprises knife edge 33 supporting one end of particle applicator 13, hydraulic load cell 34 supporting the other end of applicator 13, and hydraulic load indicator 35 connected to load cell 34 by means of circuit 36. Load indicator 35 is adapted with an adjustable on-off limit switch adjusted to provide an on-off weight signal on lead 37 whenever particle weight, as related to particle level 29, is either less or greater than a predetermined value thereof, respectively.

In order to make accurate weight and weight-change measurements associated with particle level 29, error-producing sources must either be eliminated or kept to a substantial minimum. Hence, all mechanical connections to particle applicator 13, except knife edge 33 and load cell 34, should be free of restraints, such as is provided by flexible pipe 28 between valve 27 and plenum chamber 22.

Automatic particle feed over fluidized conveyor 11 is controlled by control means 38. Control means 38 includes controller 39 which is responsive to the on-off weight signal on lead 37, as well as to the functions of control station 40 which provides for either manual on or off or automatic modes of operation. In manual mode, controller 39 and control station 40 provide either an on, or an off, control signal which is transmitted over lead 41 to solenoid valve 42. Solenoid valve 42 is connected pneumatically between a source of compressed gas not shown and conduit 14 and either applies or removes the fluid current associated with conveyor 11 in response to the on-off control signal respectively. Thus, particle movement between source 10 and receiver-dispenser 19 in particle applicator 13 is under direct control of the on-off control signal transmitted over lead 41.

In automatic operation, controller 39 and control station 40 automatically provide the on-off control signal to solenoid valve 42 in response to the on-off weight signal on lead 37.

When it is desired to coat opposite sides of strip S, the particle dispensing arrangement shown in FIGS. 4 and 5 may be used. Here it is assumed that opposite sides of strip S have previously been filmed with an adhesive material. First one side of strip S is coated as described above. Then the opposite side of the strip can be coated in sequence by passing the coated strip around rolls 43 and 43' on the uncoated side, and then passing the strip, with uncoated side down, in contact with the coating zone of a second particle applicator similar to the one described above. Sequential coating is preferred as this eliminates extra handling, including coiling and uncoiling of strip S prior to any succeeding step, such as compacting, fusing, heat treating, etc., which may be necessary to firmly affix particulate material on the strip surfaces. However, simultaneous coating of both sides of strip S is permissible where such can be achieved in practice by modifying particle applicator 13.

More particularly, particles to be dispensed in coating opposite sides of strip S, with either the same or different amounts on each side, are fed from source 44 over well-known fluidized conveyor means 45 to a plurality of particle applicators. Means 45 comprises fluidized components similar to conveyor 11 and includes main conveyor 46 having offtake 47 which feeds first branch conveyor 48, the latter having vertically adjustable flow gate 49 at its discharge end. The main conveyor 46 also feeds second branch conveyor 50 which has vertically adjustable flow gate 51 at its discharge end. With this arrangement, fluidized particles 52, 53 are caused to move from source 10 independently to particle applicators 54, 55 respectively, in predetermined maximum amounts to each applicator. Each amount is governed by particle physical properties, the fluid currents of conveyors 46, 48 and 46, 50, and the vertical positions of respective flow gates 49, 51.

Particle applicators 54, 55 each are similar to particle applicator 13. Each includes a receiver-dispenser having fluidized bed means and particle discharge assistance means. The amount of particle discharge from each applicator 54, 55 varies in a predetermined relation to particle level in each said receiver-dispenser as described above for particle applicator 13. In practice, each amount of particle discharge may be the same, or may be different, depending upon predetermined coating requirements for each of the respective sides of strip S.

Weigher means 56 is provided which produces a plurality of weight signals, each related to a separate particle level during operation of particle applicators 54, 55, respectively. Weigher means 56 comprises knife edges 57 supporting one end of each particle applicator 54, 55, hydraulic load cells 58, 59 supporting the other ends of respective applicators 54, 55 and hydraulic load indicators 60, 61 connected to load cells 58, 59 by means of circuits 62, 63, respectively. Each load indicator 60, 61 is adapted with an adjustable on-off limit switch to produce respective on-off weight signals on leads 64, 65 as does indicator 35 on lead 37. Thus, a plurality of on-off weight signals are produced, each independently of the particle level in the remaining particle applicators.

Particle applicators 54, 55 should be free of restraints, as described above for applicator 13, in order to make accurate measurements of weights and weight-changes associated with the particle level in each said applicator.

Automatic particle feed over fluidized conveyor means 45 is controlled by control means 66 which controls the powering of main conveyor 46 and one or both branch conveyors 48, 50, depending on feed requirements. Control means 66 includes controller 67 which is responsive to the plurality of on-off weight signals over leads 62, 63, as well as to the functions of control stations 68, 69, the latter providing for either manual on or off or automatic modes of operation for particle applicators 54, 55, respectively.

In manual mode, controller 67 and control station 68 provide either on, or off, control signals which are transmitted simultaneously over leads 70, 71 to solenoid valves 72, 73, respectively. Solenoid valves 72, 73 are so connected pneumatically as to either apply or remove the fluid currents associated with main conveyor 46 and first branch conveyor 48, respectively, in response to the on-off control signals. Further, controller 67 and control station 69 provide either on, or off, control signals which are transmitted simultaneously over lead 70 and 74 to solenoid valves 72, 75, respectively. Solenoid valves 72, 75 are so connected pneumatically as to either apply or remove the fluid currents associated with the main conveyor 46 and second branch conveyor 50, respectively, in response to the second set of on-off control signals. Thus, particle movement between source 44 and each receiver-dispenser in particle applicators 54, 55 is independent of each other and is under direct control of the on-off control signals transmitted over combinations of leads 70, 71 and leads 70, 74, respectively.

In automatic operation, controller 67 and control stations 68, 69 automatically provide the on-off control signals to solenoid valves 72, 73 and solenoid valves 72, 75 in response to the on-off weight signals on leads 64, 65, respectively. Thus, when either particle applicator 54, 55 requires additional particles 52, 53 as determined by its respective weight signal, the main conveyor 46 and the branch conveyor 48 or 50 are powered to feed particles from source 44 to said applicator for the duration of the weight signal associated therewith. This maintains a predetermined level of particles in said applicator independently of the other applicator while maintaining longitudinal uniformity of particle coating on the side of strip S associated with said applicator.

It is contemplated that the workpiece, for example, may be either stationary or move intermittently as well as continuously, and have many sides and one or more of these sides may be coated with particles dispensed from either the same or different sources of particles. Further, that the particles dispensed may result in either a temporary or a permanent coating on the workpiece and that the final coating may consist of more than one layer or laminations of particles dispensed from a plurality of particle applicators.

It is also contemplated that the particle applicator may have only one revolving brush roll, or other forms of particle discharge assistance means such as electrostatic thrusting, and that particle discharge may be either upward or downward toward the workpiece, so long as the amount of particles discharged varies with the level in a receiver-dispenser and particle level is related to particle weight. Further, that the weigher means may consist of either pneumatic or electronic components rather than the hydraulic components referred to above. Furthermore, that these components may provide a continuous proportional weight signal in place of the on-off weight signal, and the control means includes a controller responsive to the proportional weight signal when used, thereby enabling the fluidized conveyor means to operate continuously and proportionally from a continuous control signal in maintaining the predetermined particle level in said receiver-dispenser. Moreover, that mechanical conveyor means may be substituted for the fluidized conveyor means and that when a proportional control signal is produced a variable speed drive responsive to said signal is included with the mechanical conveyor means.

We claim:

1. A method of automatically applying a controlled amount of particles to a surface of a moving workpiece, comprising:
   (a) feeding said particles from a source into an open top receiver-dispenser of particles through one portion of said opening, said receiver-dispenser having mechanical dispensing means incorporated therein,
   (b) continuously discharging said particles upwardly through another portion of said top-opening and substantially uniformly against said surface of the workpiece in response to said mechanical dispensing means,
   (c) weighing the receiver-dispenser during said particle discharge and producing a weight signal related to particle level at the dispensing means in said receiver-dispenser, and
   (d) automatically controlling particle feed to the receiver-dispenser in response to the weight signal, thereby to maintain said particle level and discharge amount at respective predetermined levels.

2. A method of automatically applying a controlled amount of particles to a surface of a moving workpiece, which comprises:
   (a) feeding said particles from a source into an open top receiver-dispenser of particles,
   (b) fluidizing a bed of particles to a predetermined level in a fluidizing chamber within said receiver-dispenser,
   (c) mechanically rasing the fluidized particles above said predetermined level with rotating particle discharge assistance means, and continuously discharging raised particles mechanically upwardly against said surface of the workpiece,
   (d) weighing the receiver-dispenser during particle discharge and producing a weight signal related to said predetermined particle level, and
   (e) automatically controlling particle feed to the receiver-dispenser in response to the weight signal, thereby to maintain said particle level and discharge amount at respective perdetermined levels.

3. The method of claim 2 wherein step (a) includes feeding said particles through one portion of said opening in the top of said receiver-dispenser, and wherein step (c) includes discharging said particles through another portion of said top opening.

4. A method of automatically applying a controlled amount of particles to each of a plurality of surfaces of a moving workpiece, comprising:
   (a) feeding said particles from at least one source into a plurality of open top receiver-dispensers of particles through one portion of each top opening, each said receiver-dispenser having mechanical dispensing means incorporated therein and each associated with applying particles to a different surface of the workpiece, (b) continuously discharging said particles upwardly through another portion of each said top opening and substantially uniformly against a different surface of the workpiece in response to an associated mechanical dispensing means, (c) weighing each receiver-dispenser during said particle discharge and producing weight signals related to the particle level at the dispensing means in each said receiver-dispenser, and (d) automatically controlling particle feed to each receiver-dispenser in response to the weight signals, thereby to independently maintain said particle level and discharge amount associated with each receiver-dispenser at respective predetermined values.

5. A method of automatically applying a controlled amount of particles to each of a plurality of surfaces of a moving workpiece, which comprises:

(a) feeding said particles from at least one source independently into a plurality of open top receiver-dispensers of particles, (b) fluidizing a bed of particles in each receiver-dispenser to a predetermined level in a fluidizing chamber therein, (c) mechanically raising the fluidized particles in each receiver-dispenser above said predetermined level with rotating particle discharge assistance means, and continuously discharging raised particles mechanically upwardly against a different surface of the workpiece, (d) weighing each receiver-dispenser during particle discharge and producing weight signals related to each said predetermined particle level, and (e) automatically controlling particle feed to each receiver-dispenser in response to the weight signals, thereby to independently maintain said particle level and discharge amount associated with each receiver-dispenser at respective predetermined values.

6. The method of claim 5 wherein step (a) includes feeding said particles through one portion of said opening in the top of each said receiver-dispenser, and wherein step (c) includes discharging said particles through another portion of each said top opening.

References Cited

UNITED STATES PATENTS

| | | | |
|---|---|---|---|
| 2,376,343 | 5/1945 | Carlton | 118—627 |
| 2,764,316 | 9/1956 | Sylvest | 222—71 X |
| 3,103,445 | 9/1963 | Bogdonoff et al. | 355—17 |
| 3,323,933 | 6/1967 | Barford et al. | 117—17 |

RALPH HUSACK, Primary Examiner

U.S. Cl. X. R.

117—17, 31, 68, DIG. 6; 118—8, 627; 222—1, 55